United States Patent
Yang et al.

(10) Patent No.: US 12,306,944 B1
(45) Date of Patent: May 20, 2025

(54) METHOD AND APPARATUS FOR RUNTIME DETECTION OF BUS PROBING/TAMPERING IN COMPUTER SYSTEMS

(71) Applicant: University of Rhode Island Board of Trustees, Kingston, RI (US)

(72) Inventors: Ken Qing Yang, Saunderstown, RI (US); Tao Wei, West Kingston, RI (US); Zhenyu Xu, Kingston, RI (US)

(73) Assignee: University of Rhode Island Board of Trustees, Kingston, RI (US)

( * ) Notice: Subject to any disclaimer, the term of this patent is extended or adjusted under 35 U.S.C. 154(b) by 203 days.

(21) Appl. No.: 17/565,069

(22) Filed: Dec. 29, 2021

Related U.S. Application Data (60) Provisional application No. 63/190,035, filed on May 18, 2021, provisional application No. 63/131,644, filed on Dec. 29, 2020.

(51) Int. Cl.
*H04L 29/06* (2006.01)
*G06F 21/56* (2013.01)
*G06F 21/85* (2013.01)

(52) U.S. Cl.
CPC ............ *G06F 21/566* (2013.01); *G06F 21/85* (2013.01); *G06F 2221/034* (2013.01)

(58) Field of Classification Search
CPC ... G06F 21/566; G06F 21/85; G06F 2221/034
See application file for complete search history.

(56) References Cited

U.S. PATENT DOCUMENTS

| 4,697,183 | A | * | 9/1987 | Jenning | H04L 5/143 324/233 |
|---|---|---|---|---|---|
| 5,053,693 | A | | 10/1991 | Bohnert et al. | |
| 6,644,114 | B1 | | 11/2003 | McEwan | |

(Continued)

FOREIGN PATENT DOCUMENTS

| CN | 1666109 A | 9/2005 |
|---|---|---|
| WO | 2021155176 A1 | 8/2021 |

OTHER PUBLICATIONS

Z. Xu, T. Mauldin, Z. Yao, S. Pei, T. Wei and Q. Yang, "A Bus Authentication and Anti-Probing Architecture Extending Hardware Trusted Computing Base off CPU Chips and Beyond," 2020 ACM/IEEE 47th Annual International Symposium on Computer Architecture (ISCA), Valencia, Spain, 2020, pp. 749-761, Jul. 13, 2020.*

(Continued)

*Primary Examiner* — Jason K Gee
(74) *Attorney, Agent, or Firm* — Philip D. Askenazy; Peacock Law P.C.

(57) ABSTRACT

Methods and apparatuses for detection of probing attacks or other tampering on any bus, including on chip and off chip buses. The method can be performed during runtime, concurrently with normal data transfer on the bus, without stopping the normal data transfer, and without imposing any latency to communications on the bus. The tampering or attack is detected by detecting a phase shift between the input waveform and the output waveform of the bus transmitter. The phase shift is induced by an input impedance change at the output of the bus transmitter caused by the tampering. The phase shift can be measured by detecting a change in the output probability of a metastable flip flop.

10 Claims, 11 Drawing Sheets

(56) References Cited

U.S. PATENT DOCUMENTS

| | | | |
|---|---|---|---|
| 6,980,028 | B1 | 12/2005 | Plants et al. |
| 9,143,236 | B1 | 9/2015 | Bartur et al. |
| 11,105,879 | B1 | 8/2021 | Cao et al. |
| 11,474,141 | B1 | 10/2022 | Wei et al. |
| 2002/0130667 | A1 | 9/2002 | Noe |
| 2003/0009683 | A1* | 1/2003 | Schwenck ............... G06F 21/87 713/194 |
| 2003/0038618 | A1 | 2/2003 | Gumm |
| 2003/0235306 | A1 | 12/2003 | Fox et al. |
| 2005/0068244 | A1 | 3/2005 | Downs et al. |
| 2005/0264297 | A1 | 12/2005 | Gorka |
| 2005/0270091 | A1 | 12/2005 | Kozyrev et al. |
| 2006/0261259 | A1 | 11/2006 | Beinhocker |
| 2008/0048726 | A1 | 2/2008 | Hafed |
| 2009/0218401 | A1 | 9/2009 | Moran et al. |
| 2009/0315565 | A1 | 12/2009 | Wyar et al. |
| 2010/0073014 | A1 | 3/2010 | Maslen |
| 2010/0118292 | A1 | 5/2010 | Park et al. |
| 2010/0277184 | A1 | 11/2010 | Geren |
| 2011/0181871 | A1 | 7/2011 | Childers et al. |
| 2019/0129026 | A1 | 5/2019 | Sumi et al. |
| 2023/0050241 | A1 | 2/2023 | Yang et al. |

OTHER PUBLICATIONS

Oksman, Aapo. "A Method for Detecting DRAM Bus Tampering." Espoo Dec. 31, 2019. 86 pages.*

Adam, D.S. Christian, et al., "Analog-to-Probability Conversion-Efficient Extraction of Information Based on Stochastic Signal Models", Progress in Industrial Mathematics at ECMI 2018, Springer International Publishing, 2019, 583-587.

Aga, S. , et al., "Invisimem: Smart memory defenses for memory bus side channel", ACM SIGARCH Computer Architecture News, vol. 45, No. 2, 2017, 94-106.

Aleph, O. , "Smashing the stack for fun and profit", http://www.shmoo.com/phrack/Phrack49/p49-14, downloaded Mar. 1, 2021, 1996.

Altera Corporation , "DDR2, DDR3, and DDR4 SDRAM Board Design Guidelines", https://documents.pub/document/ddr2-ddr3-and-ddr4-sdram-board-design-guidelines-4-ddr3-and-ddr4-sdram-board.html?page=1, Dec. 16, 2013.

Arm Architecture , "Security technology building a secure system using trustzone technology", (White Paper), 2009.

Arnautov, S. , et al., "(SCONE): Secure linux containers with intel (SGX)", 12th (USENIX) Symposium on Operating Systems Design and Implementation, 2016, 689-703.

Arnold, T. W., et al., "IBM 4765 cryptographic coprocessor", IBM Journal of Research and Development, vol. 56, No. 1.2, 2012, 10-11.

Awad, A. , et al., "Obfusmem: A low-overhead access obfuscation for trusted memories", ACM SIGARCH Computer Architecture News, vol. 45, No. 2, ACM, 2017, 107-119.

Awad, A. , et al., "Triad-nvm: Persistency for integrity-protected and encrypted non-volatile memories", Proceedings of the 45th International Symposium on Computer Architecture, ACM, 2019, 104-115.

Aziz, P. M., et al., "An overview of sigma-delta converters", IEEE Signal Processing Magazine, vol. 13, No. 1, 1996, 61-84.

Barber, K. , et al., "Specshield: Shielding speculative data from microarchitectural covert channels", 28th International Conference on Parallel Architectures and Compilation Techniques (PACT), IEEE, 2019, 151-164.

Bar-El, H. , et al., "The sorcerer's apprentice guide to fault attacks", Proceedings of the IEEE, vol. 94, No. 2, 2006, 370-382.

Barenghi, A. , et al., "Fault injection attacks on cryptographic devices: Theory, practice, and countermeasures", Proceedings of the IEEE, vol. 100, No. 11, 2012, 3056-3076.

Barnoski, M. K., et al., "Fiber waveguides: a novel technique for investigating attenuation characteristics", Appl. Opt., vol. 15, No. 9, 1976, 2112-2115.

Baumann, A. , et al., "Shielding applications from an untrusted cloud with haven", ACM Transactions on Computer Systems (TOCS), vol. 33, No. 3, 2015, 8.

Bellare, M. , et al., "A concrete security treatment of symmetric encryption", Proceedings 38th Annual Symposium on Foundations of Computer Science, IEEE, 1997, 394-403.

Bellare, M. , et al., "Keying hash functions for message authentication", Annual International Cryptology Conference, Springer, 1996, 1-15.

Bishop, J. A., et al., "A Rapid-Acquisition Electrical Time-Domain Reflectometer for Dynamic Structure Analysis", IEEE Trans. Instrum. Meas., vol. 60, No. 2, 2011, 655-661.

Champagne, D. , et al., "Scalable Architectural support for trusted software", HPCA-16 2010 the Sixteenth International Symposium on High-Performance Computer Architecture, IEEE, 2010, 1-12.

Chari, S. , et al., "Towards sound approaches to counteract power-analysis attacks", Annual International Cryptology Conference, Springer, 1999, 398-412.

Chean, V. , et al., "Study of the mechanical behavior of the optical fiber by a mark-tracking method", EPJ Web of Conferences, vol. 6, 2010, 34002-1-8.

Chen, Zhen , et al., "FiberID: Molecular-level secret for identification of things", 2014 IEEE International Workshop on Information Forensics and Security, 10.1109/WIFS.2014.7084308, 2014.

Chen, X. , et al., "Universal Fiber for Short-Distance Optical Communications", J. Light Technol., vol. 37, No. 2, 2019, 389-395.

Corey, S. D., et al., "Interconnect characterization using time-domain reflectometry", IEEE Transactions on Microwave Theory and Techniques, vol. 43, No. 9, 1995, 2151-2156.

Costan, V. , et al., "Sanctum: Minimal hardware extensions for strong software isolation", 25th (USENIX) Security Symposium ({USENIX} Security 16), 2016, 857-874.

Cowan, C. , et al., "Buffer overflows: Attacks and defenses for the vulnerability of the decade", Proceedings DARPA Information Survivability Conference and Exposition DISCEX '00, vol. 2, IEEE, 2000, 119-129.

Cuppu, V. , et al., "A performance comparison of contemporary DRAM architectures", ACM SIGARCH Computer Architecture News, vol. 27, No. 2, IEEE Computer Society, 222-233, 1999.

Daigneault, M. A., et al., "A high-resolution time-to-digital converter on FPGA using dynamic reconfiguration", IEEE Transactions on Instrumentation and Measurement, vol. 60, No. 6, 2011, 2070-2079.

Dayeol, Lee , et al., "An off-chip attack on hardware enclaves via the memory bus", 29th USENIX Security Symposium, Aug. 12-14, 2020, Virtual Event, 2020.

Dong, X. , et al., "Combined Attenuation and High-Resolution Fault Measurements Using Chaos-OTDR", IEEE Photonics J., vol. 7, No. 6, 2015, 1-6.

Du, Y. , et al., "Unclonable optical fiber identification based on Rayleigh backscattering signatures", J. Lightw. Technol., vol. 35, No. 21, Nov. 1, 2017, 4634-4640.

EE Times , "Maxim: Secure Supervisor ic has active tamper detection", https://www.eetimes.com/maxim-secure-supervisor-ic-has-active-tamper-detection, downloaded Mar. 1, 2021, 2009.

Fang, H. , et al., "Prefetch-guard: Leveraging hardware prefetches to defend against cache timing channels", 2018 IEEE International Symposium on Hardware Oriented Security and Trust (HOST), IEEE, 2018, 187-190.

Favi, C. , et al., "A 17ps time-to-digital converter implemented in 65nm technology", Proceedings of the 7th ACM SIGDA International Symposium on Field-Programmable Gate Arrays, FPGA '09, 2009, 113-120.

Fletcher, C. W., et al., "Freecursive oram: [nearly] free recursion and integrity verification for position-based oblivious ram", ACM SIGARCH Computer Architecture News, vol. 43, No. 1, 2015, 103-116.

Froggatt, M. , et al., "High-spatial-resolution distributed strain measurement in optical fiber with Rayleigh scatter", Applied Optics, vol. 37, Apr. 1, 1998, 1735-1740.

Getsinger, W. J., "An introduction to microwave transmission lines", Proc. 35th Midwest Symp. Circuits Syste., vol. 2, 1992, 1016-1019.

(56) References Cited

OTHER PUBLICATIONS

Gruss, D., et al., "Rowhammer. js: A remote software-induced fault attack in javascript", International Conference on Detection of Intrusions and Malware, and Vulnerability Assessment, Springer, 2016, 300-321.

Gueron, S., "Memory encryption for general-purpose processors", IEEE Security and Privacy, vol. 14, No. 6, 2016, 54-62.

Gupta, S., et al., "Cross-Site Scripting (XSS) attacks and defense mechanisms: classification and state-of-the-art", International Journal of System Assurance Engineering and Management, vol. 8, No. 1, 2017, 512-530.

Halderman, J. A., et al., "Lest we remember: cold-boot attacks on encryption keys", Communications of the ACM, vol. 52, No. 5, 2009, 91-98.

Hartog, A. H., "Advances in optical time domain reflectometry", Symposium on Optical Fiber Measurements, Mar. 1, 1984, 89-94.

Hastings, A., "Are Computer Architects to Blame for the State of Security Today?", https://www.sigarch.org/are-computer-architects-to-blame-for-the-state-of-security-today/, downloaded Mar. 1, 2021, 2019.

He, H., et al., "Self-mixing demodulation for coherent phase-sensitive OTDR system", Sensors, vol. 16, No. 5, 2016, 681-690.

Henson, M., et al., "Memory encryption: A survey of existing techniques", ACM Computering Surveys (CSUR), vol. 46, No. 4, 2014, 53.

Herder, C., et al., "Physical unclonable functions and applications: A tutorial", Proceedings of the IEEE, vol. 102, No. 8, 2014, 1126-1141.

Hill, K. O., et al., "Fiber Bragg grating technology fundamentals and overview", J. Light. Technol., vol. 15, No. 8, 1997, 1263-1276.

Hinaga, S., et al., "Thermal effects on pcb laminate material dielectric constant and dissipation factor", IPC Apex Expo, 2010.

Hu, Z., et al., "Improving spatial Resolution of Chaos OTDR Using Significant-Bit Correlation Detection", IEEE Photonics Technol. Lett., vol. 31, No. 13, 2019, 1029-1032.

Jain, A. K., et al., "IEEE Trans. Circuits Syst. Video Technol.", vol. 14, No. 1, Jan. 2004, 4-20.

Rixner, S., et al., "Memory access scheduling", ACM SIGARCH Computer Architecture News, vol. 28, No. 2, ACM, 2000, 128-138.

Rogers, B., et al., "Using address independent seed encryption and bonsai merkle trees to make secure processors os- and performance-friendly", Proceedings of the 40th Annual IEEE/ACM International Symposium on Microarchitecture, IEEE Computer Society, 2007, 183-196.

Sadeghi, A. R., et al., "Security and privacy challenges in industrial internet of things", 2015 52nd ACM/EDAC/IEEE Design Automation Conference (DAC), IEEE, 2015, 1-6.

Saileshwar, G., et al., "Morphable counters: Establishing compact integrity trees for low-overhead secure memories", 2018 51st Annual IEEE/ACM International Symposium on Microarchitecture (Micro), IEEE, 2018, 416-427.

Saileshwar, G., et al., "Synergy: Rethinking secure-memory design for error-correcting memories", 2018 IEEE International Symposium on High Performance Computer Architecture (HPCA), IEEE, 2018, 454-465.

Santos, N., et al., "Towards Trusted Cloud Computing", HotCloud, vol. 9, No. 9, 2009, 3.

Seaborn, M., et al., "Exploiting the DRAM rowhammer bug to gain kernel privileges", Black Hat, vol. 15, 2015.

Sehatbakhsh, N., et al., "Emma: Hardware/software attestation framework for embedded systems using electromagnetic signals", Proceedings of the 52nd Annual IEEE/ACM International Symposium on Microarchitecture, Association for Computing Machinery, 2019, 983-995.

Smith, S. W., et al., "Building a high-performance, programmable secure coprocessor", Computer Networks, Vo. 31, No. 8, 1999, 831-860.

Stefanov, E., et al., "Path ORAM: an extremely simple oblivious RAM protocol", Proceedings of the 2013 ACM SIGSAC Conference on Computer & Communications Security, ACM, 2013, 299-310.

Stove, A. G., "Linear FMCW radar techniques", IEEE Proc. F Radar Signal Process., vol. 139, No. 5, Oct. 1992, 343-350.

Sudharani, K., et al., "Studies on Coding Techniques and It's Application to OTDR", Project Report, Department of Electronics & Communication Engineering, National Institute of Technology, Rourkela, India, 2009.

Suh, G. E., et al., "AEGIS: architecture for tamper-evident and tamper-resistance processing", ACM International Conference on Supercomputing 25th Anniversary vol. ACM, 2014, 357-368.

Suh, G. E., et al., "Design and implementation of the AEGIS single-chip secure processor using physical random functions", ACM SIGARCH Computer Architecture News, vol. 33, No. 2, IEEE Computer Society, 2005, 25-36.

Suh, G. E., et al., "Physical unclonable functions for device authentication and secret key generation", 2007 44th ACM/IEEE Design Automation Conference, IEEE, 2007, 9-14.

Tateda, Mitshuhiro, et al., "Advances in optical time domain reflectometry", Journal of Lightwave Technology, vol. 7, No. 8, Aug. 1989, 1217-1224.

Trikalinou, A., et al., "Taking DMA Attacks to the Next Level", BlackHat USA 2017, Las Vegas, NV, Jul. 22-27, 2017, 2017.

Trusted Computing Group, "Trusted Platform Module (TPM) Summary", https://trustedcomputinggroup.org/resource/trusted-platform-module-tpm-summary, downloaded Mar. 1, 2021, 2008.

Van Bulck, J., et al., "Foreshadow: Extracting the keys to the intel {SGX} kingdom with transient out-of-order execution", 27th {USENIX} Security Symposium ({USENIX} Security 18), 2018, 991-1008.

Vogt, P., et al., "Cross Site Scripting Prevention with Dynamic Data Tainting and Static Analysis", NDSS, vol. 2007, 2007, 12.

Wang, R., et al., "D-ORAM: Path-ORAM delegation for low execution interference on cloud servers with untrusted memory", 2018 IEEE International Symposium on High Performance Computer Architecture (HPCA), IEEE, 2018, 416-427.

Wang, Y., et al., "SecDCP: secure dynamic cache partitioning for efficient timing channel protection", Proceedings of the 53rd Annual Design Automation Conference, ACM, 2016, 74.

Wei, T., et al., "Transmission Line Identification via Impedance Inhomogeneity Pattern", IEEE Journal of Radio Frequency Identification, vol. 3, No. 4, Dec. 2019, 245-251.

Weisse, O., et al., "NDA: Preventing Speculative Execution Attaches at Their Source", Proceedings of the 52nd Annual IEEE/ACM International Symposium on Microarchitecture, ACM, 2019, 572-586.

Werner, M., et al., "Transparent memory encryption and authentication", 2017 27th International Conference on Field Programmable Logic and Applications, FPL 2017, IEEE, 2017, 1-6.

Whetsel, L., "An IEEE 1149.1 Based Logic/Signature Analyzer in a Chip", ITC, 1991, 869-878.

Xilinx, "UltraScale Architecture SelectIO Resources User Guide UG571 (v1.5)", Nov. 24, 2015.

Xilinx, "UltraScale Architecture-Based FPGAs Memory IP v1.4 LogiCore IP Product Guide, Vivado Design Suite", Oct. 22, 2021.

Xilinx, Inc., "Versal Architecture and Product Data Sheet: Overview", https://dokumen.tips/documents/versal-architecture-and-product-data-sheet-overview-ds950-prime-series-the.html?page=1, Downloaded Jun. 13, 2022, Oct. 2, 2018.

Xu, Z., et al., "A Bus Authentication and Anti-Probing Arachitecture Extending Hardware Trusted Computing Base off CPU Chips and beyond", Proceedings—International Symposium on Computer Architecture, 2020, 749-761.

Yan, C., et al., "Improving cost, performance, and security of memory encryption and authentication", ACM SIGARCH Computer Architecture News, vol. 34, No. 2, IEEE Computer Society, 2006, 179-190.

Yang, K., et al., "A2: Analog malicious hardware", 2016 IEEE Symposium on Security and Privact (SP), IEEE, 2016, 18-37.

(56) References Cited

OTHER PUBLICATIONS

Yang, J., et al., "Fast Secure Processor for inhibiting software piracy and tampering", Proceedings of the 36th Annual IEEE/ACM International Symposium on Microarchitecture, IEEE Computer Society, 2003, 351.
Yao, Z., et al., "Digitally Integrated Self-Trained Predistortion Curve Finder for Passive Sweep Linearization of Semiconductor Lasers", IEEE J. Sel. Top. Quantum Electron., vol. 25, No. 6, Nov. 12, 2019.
Yao, Z., et al., "Low-cost optical fiber physical unclonable function reader baed on a digitally integrated semiconductor LiDAR", Appl. Opt., vol. 58, No. 23, Aug. 10, 2019, 6211-6216.
Yitbarek, S. F., et al., "Cold boot attacks are still hot: Security analysis of memory scramblers in modern processors", 2017 IEEE International Symposium on High Performance Computer Architecture (HPCA), IEEE, 2017, 313-324.
Young, V., et al., "Deuce: Write-efficient encryption for non-volatile memories", ACM SIGPLAN Notices, vol. 50, No. 4, 2015, 33-44.
Zhang, F., et al., "Robust counterfeit pcb detection exploting intrinsic trace impedance variations", 2015 IEEE 33rd VLSI Test Symposium (VTS), IEEE, 2015, 1-6.
Zhu, C., et al., "Truly distributed coaxial cable sensing based on random inhomogeneities", IEEE Trans. Instrum. Meas., vol. 68, No. 11, Nov. 2019, 4600-4607.
Zinsou, R., et al., "Recent progress in the performance enhancement of phase-sensitive OTDR vibration sensing systems", Sensors, vol. 19, No. 7, 2019, 1709-1728.
Jia, S., "Doubling up on Fiber Capacity: A Winning Strategy for Full Duplex Coherent Optics", https://www.cablelabs.com/blog/doubling-fiber-capacity-winning-strategy-full-duplex-coherent-optics, Downloaded May 23, 2022, Mar. 8, 2018.
Jupiter Instruments, "12C bus monitor", http://www.jupiter.com/, downloaded Mar. 1, 2021.
Kaplan, D., et al., "AMD Memory Encryption", White Paper, http://amd-dev.wpengine.netdna-cdn.com/wordpress/media/2013/12/AMD_Memory_Encryption_Whitepaper_v7-Public.pdf, Apr. 21, 2016.
Kim, Y., et al., "Analyzing OTDR Measurement Data Using the Kalman Filter", IEEE Trans. Instrum. Meas., vol. 57, No. 5, 2008, 947-951.
Kim, J. S., et al., "The DRAM latency PUF: Quickly evaluating physical unclonable functions by exploiting the latency-reliability tradeoff in modern commodity DRAM Devices", 2018 IEEE International Symposium on High Performance Computer Architecture (HPCA), IEEE, 2018, 194-207.
Kiriansky, V., et al., "DAWG: A defense against cache timing attacks in speculative execution processors", 2018 51st Annual IEEE/ACM International Symposium on Microarchitecture (Micro), IEEE, 2018, 974-987.
Kleberger, P., et al., "Security aspects of the in-vehicle network in the connected car", IEEE Intelligent Vehicles Symposium Proceedings, IEEE, 2011, 528-533.
Kocher, P., et al., "Spectre attacks: Exploiting speculative execution", 2019 IEEE Symposium on Security and Privacy (SP), IEEE, 2019, 1-19.
Koyamada, Y., et al., "Fiber-optic distributed strain and temperature sensing with very high measurand resolution over long range using coherent OTDR", J. Light. Technol., vol. 27, No. 9, 2009, 1142-1146.
Kuznia, C., et al., "Novel high-resolution OTDR technology for multi-Gbps transceivers", OFR 2014, Optical Society of America, 2014, 1-3.
Laferriere, S. W.J., et al., "Reference Guide to Fiber Optic Testing, Second Edition, vol. 1", JDS Uniphase Corporation, 2011.
Lalam, N., et al., "Performance Improvement of Brillouin Ring Laser Based BOTDR System Employing a Wavelength Diversity Technique", J. Light. Technol., vol. 36, No. 4, 2018, 1084-1090.
Lee, D., et al., "A 16ps-resolution random equivalent sampling circuit for tdr utilizing a vernier time delay generation", 2003 IEEE Nuclear Science Symposium Conference Record (IEEE Cat. No. 03CH37515), vol. 2, IEEE, 2003, 1219-1223.
Lee, D., et al., "Optimization of SNR Improvement in the Noncoherent OTDR Based on Simplex Codes", J. Light. Technol., vol. 24, No. 1, 2006, 322.
Lee, D., et al., "SNR enhancmenet of OTDR using biorthogonal codes and generalized inverses", IEEE Photonics Technol. Lett., vol. 17. No. 1, 2005, 163-165.
Li, Q., et al., "High Spatial Resolutation BOTDR Based on Differential Brillouin spectrum Technique", IEEE Photonics Technol. Lett., vol. 28, No. 14, 2016, 1493-1496.
Lie, D., et al., "Architectural support for copy and tamper resistant software", Acm Sigplan Notices, vol. 35, No. 11, 2000, 168-177.
Liehr, S., et al., "Wavelength-scanning coherent OTDR for dynamic high strain resolution sensing", Opt. Express, vol. 26, No. 8, 2018, 10573.
Lipp, M., et al., "Meltdown: Reading kernel memory from use space", 27th {USENIX} Security Symposium ({USENIX} Security 18), 2018, 973-990.
Liu, Y., et al., "Raman distributed temperature sensor with high spatial and temperature resolution using optimized graded-index few-mode fiber over 25 km-long distance", Paper, 26th Annual Conference on Optical Fiber Sensors, Sep. 24-28, 2018, Lausanne, Switzerland, 2018.
Liu, X., et al., "When good becomes evil: Keystroke inference with smartwatch", Proceedings of the 22nd ACM SIGSAC Conference on Computer and Co9mmunications Security, ACM, 2015, 1273-1285.
Lu, P., et al., "Distributed optical fiber sensing: Review and perspective", Appl. Phys. Rev., vol. 6, No. 4, 2019.
LunaInc, "Optical Backscattering Reflectometry (OBR)—Overview and Applications", Whitepaper downloaded from Lunainc.com, Aug. 17, 2018.
Lunglmay, M., et al., "Linearized Bregman Iterations for Automatic Optical Fiber Fault Analysis", IEEE Trans. Instrum. Meas., vol. 68, No. 10, 2019, 3699-3711.
Maas, M., et al., "Phantom: Practical oblivious computation in a secure processor", Proceedings of the 2013 ACM SIGSAC Conference on Computer & Communications Security, ACM, 2013, 311-324.
Manich, S., et al., "Detection of probing attempts in secure ics", 2012 IEEE International Symposium on Hardware-Oriented Security and Trust, IEEE, 2012, 134-139.
Maricevic, Z. A., et al., "Timedomain measurements with Hewlett-Packard network analyzer HP 8510 using the matrix pencil method", IEEE Trans. Microw. Theory Techn., vol. 39, No. 3, Mar. 1991, 538-547.
Mauldin, T., et al., "Minimal Overhead Optical Time-domain Reflectometer via I/O Integrated Data Converter Enabled by Field Programmable Voltage Offset", The International Conference on Field-Programmable Logic and Applications, IEEE, 2021, 160-166.
Maxim Integrated, "DS3645: 4KB Secure Memory with Tamper Protecton for Network Server Applications", https://www.maximintegrated.com/en/products/embedded-security/security-managers/DS3645.html, downloaded Mar. 1, 2021.
McKeen, F., et al., "Innovative instructions and software model for isolated execution", Hasp (R) isca, vol. 10, No. 1, 2013.
Meijer, C., et al., "Self-encrypting deception: weaknesses in the encryption of solid state drives", 2019 IEEE Symposium on Security and Privacy (SP), IEEE, 2019, 72-87.
Messerges, T. S., et al., "Examining smart-card security under the threat of power analysis attacks", IEEE Transactions on Computers, vol. 51, No. 5, 2002, 541-552.
Moghadas, S. H., et al., "ROPAD: A Fully Digital Predictive Ring Oscillator Probing Attempt Detector", 2020 57th ACM/IEEE Design Automation Conference, 2020, 1-6.
Muanenda, Y., "Recent Advances in Distributed Acoustic Sensing Based on Phase-Sensitive Optical Time Domain Reflectometry", J. Sensors, vol. 2018, 2018.
Nakazawa, M., "Rayleigh Backscattering Theory for Single-Mode Optical Fibers", J. Opt. Soc. Am., vol. 73, No. 9, 1983, 1175-1180.
Naraghi, S., "Time-Based Analog in Digital Converters", PH.D. Dissertation, University of Michigan, 2009.

(56) References Cited

OTHER PUBLICATIONS

Oksman, A., "A Method for Detecting DRAM Bus Tampering", Thesis, Aalto University, Espoo, Finland, 2020.

Optical Zonu Corporation, "iSFC(R) Micro-OTDR Transceiver Series Fast Fiber Fault Finder(TM) Product Specification Sheet", Optical Zonu Corporation, 2014.

Paley, S., et al., "Active protection against pcb physical tampering", 2016 17th International Symposium on Quality Electronic Design (ISQED), IEEE, 2016, 356-361.

Park, B., et al., "A metal-via resistance based physically unclonable function with 1.18% native instability", 2019 IEEE Custom Integrated Circuits Conference (CICC), IEEE, 2019, 1-4.

Park, N., et al., "Coded optical time domain reflectometry: principle and applications", Passive Components Fiber-Based Devices IV, Proc. of SPIE, edited by Li, Ming-Jun, et al., vol. 6781, 2007, 678129-1-12.

Parkin, N., et al., "Gigabit SFP transceiver with integrated optical time domain reflectometer for ethernet access services", 39th European Conference and Exhibition on Optical Communications (ECOC 2013), 2013, 1-3.

Pastor-Graells, J., et al., "Single-shot distributed temperature and strain tracking using direct detection phase-sensitive OTDR with chirped pulses", Opt. Express, vol. 24, No. 12, 2016, 13121-13133.

Pearson, Chris, "Clock Skew in Large Multi-GHz Clock Trees", Analog Dialogue 53-01, 2019.

Purisima, M. C.L., et al., "Fpga implementation of a time domain reflectometry (tdr) system for slope monitoring applications", TENCON 2010-2010 IEEE Region 10 Conference, 2010, 1198-1202.

Quisquater, J. J., et al., "Electromagnetic analysis (ema): Measures and counter-measures for smart cards", International Conference on Research in Smart Cards, Springer, 2001, 200-210.

Raguram, R., et al., "iSpy: automatic reconstruction of typed input from compromising reflections", Proceedings of the 18th ACM Conference on Computer and Communications Security, ACM, 2011, 527-536.

Razavi, B., "Design of Analog CMOS Integrated Circuits, Second Edition", McGraw Hill Education, 2017, 704.

Ren, L., et al., "Design and implementation of the ascend secure processor", IEEE Transactions and Dependable and Secure Computing, vol. 16, No. 2, 2017, 204-216.

Riera, A., et al., "Unobstrusive biometric system based on electroencephalogram analysis", EURASIP J. Adv. Signal Process, vol. 2008, Art. No. 143728, Oct. 2007, 1-8.

\* cited by examiner

METHOD AND APPARATUS FOR RUNTIME DETECTION OF BUS PROBING/TAMPERING IN COMPUTER SYSTEMS

CROSS-REFERENCE TO RELATED APPLICATIONS

This application claims priority to and the benefit of the filing of U.S. Provisional Patent Application No. 63/131,644, entitled "Method and Apparatus for Runtime Detection of Bus Probing/Tampering in Computer Systems", filed on Dec. 29, 2020, and Provisional Patent Application No. 63/190,035, entitled "Method and Apparatus for Runtime Detection of Bus Probing/Tampering in Computer Systems", filed on May 18, 2021, and the entirety of these applications is incorporated herein by reference.

STATEMENT REGARDING FEDERALLY SPONSORED RESEARCH OR DEVELOPMENT

This invention was made with government support under Contract No. 2027069 awarded by the National Science Foundation. The government has certain rights in the invention.

BACKGROUND OF THE INVENTION

Field of the Invention (Technical Field)

The present invention is related to detection of on-chip and off-chip probing attacks.

Background Art

Note that the following discussion may refer to a number of publications and references. Discussion of such publications herein is given for more complete background of the scientific principles and is not to be construed as an admission that such publications are prior art for patentability determination purposes.

It has been reported that physical probing attacks can reveal confidential information in an electronic system. Such probing attacks require access to the electronic system and can be categorized as on-chip probing and off-chip probing. On-chip probing is considered an invasive hardware attack. An attacker typically removes the package of an integrated circuit (IC) chip and uses a microprobe to measure signals from critical connections, such as the data bus. In contrast, off-chip probing is considered non-invasive. An attacker typically uses low-cost probes or specially designed chips to measure signals from circuit traces, such as the data bus between a computer processing unit (CPU) and a memory chip.

Physical probing/tampering on an interconnecting bus can reveal confidential information of data being transferred from one chip to another. An adversary can use low-cost probes or specially designed probes (interposers) together with a logic analyzer or an oscilloscope to eavesdrop on data buses. For example, it has been demonstrated that one can launch a Direct Memory Access (DMA) attack on a Dual In-line Memory Module (DIMM) via an interposer and logic analyzer. The classic solution to protect data privacy during transfer is data encryption. However, the grand challenge of encryption on high-speed buses is very high overhead in terms of extra latency and power consumption. This is especially painful for external Double Data Rate (DDR) memory buses, where full encryption requires every write/read transaction to be encrypted/decrypted at a high clock rate. Thus, most encryption solutions perform partial DDR memory protection. In addition, memory encryption only encrypts data, but not addresses, since DDR chips do not have a decryption engine. Also, even if DDR chips are equipped with a decryption engine, securely passing the encryption key from memory controller to DDR chips is challenging.

Several methods aimed at protecting buses at their physical layer have been proposed. Detecting changes in the impedance of the Dynamic Random-Access Memory (DRAM) bus caused by probing/tampering can be indirectly measured by introducing controlled DRAM write errors, but this method requires halting the entire system to perform detection, adding significant latency and making it impossible for runtime protection. Other methods require the use of several external circuit components which are difficult to implement, limiting their broader application.

SUMMARY OF THE INVENTION
(DISCLOSURE OF THE INVENTION)

An embodiment of the present invention is a method for detecting tampering with a bus, the method comprising detecting a phase shift between an input waveform and an output waveform of a bus transmitter. The phase shift is preferably induced by an input impedance change at an output of the bus transmitter. The method is preferably performed during runtime, concurrently with normal data transfer on the bus, without stopping the normal data transfer, and imposing zero latency to communications on the bus. The method preferably comprises converting the output waveform to a digital format. The detecting step is preferably performed by a circuit comprising a flip flop. The phase shift is preferably detected at rising and/or falling edges of data being transmitted by the transmitter. The method preferably comprises delaying the output waveform, thereby placing the flip flop into a metastable state prior to use of the bus. The method preferably comprises detecting a change in an output probability of the flip flop. The method preferably comprises detecting a difference in a time delay at which an output of the flip flop transitions between 0 and 1.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF EMBODIMENTS OF THE INVENTION

Embodiments of the present invention are methods and apparatuses for detecting probing attacks at run-time; i.e., the detection action preferably operates in parallel with the normal data transfer on a bus without any interference. The detection action preferably does not require stopping normal data transfer and other operations of the system and therefore imposes zero latency to data transfer on the bus or other communication channel or transmission line. The present invention is preferably scalable and capable of detecting both on-chip and off-chip bus probing attacks, and can work on both single-ended and differential buses. The detection circuit preferably comprises only a small addition and/or modification to the existing data bus driver (transmitter) on a silicon chip, and preferably comprises simple circuitry which uses a minimum of computational resources and footprint. The present invention can eliminate the necessity for data encryption and decryption, particularly for applications where power and/or latency constraints are stringent.

This invention can be used to protect various serial and parallel buses, both on-chip and off-chip, including but not limited to a Dynamic Random-Access Memory (DRAM) bus, Ethernet bus, Peripheral Component Interconnect Express (PCIe) bus, interposer/bus in chiplets, and any communication interconnect in computer systems such as desktop computers, servers, embedded computers, and other electronic devices with transmission lines. As used throughout the specification and claims, the term "bus" means any bus, serial bus, parallel buses, on-chip bus, off-chip bus, single-ended bus, differential bus, Dynamic Random-Access Memory (DRAM) bus, Ethernet bus, Peripheral Component Interconnect Express (PCIe) bus, interposer/bus in chiplets, communication interconnect, transmission line, and the like. As used throughout the specification and claims, the term "tampering" means probing, tampering, attacking, modifying, installing an interposer, power-based side channel attacking, power-analysis attacking, power-glitch attacking, cold boot attacking, and the like.

The present invention comprises methods and apparatuses for detecting bus probing/tampering preferably by tracking the phase shift of the (preferably digital) output waveform at the transmitter (Tx) side, induced by an input impedance ($Z_{in}$) change of the bus at Tx. The input impedance change occurs essentially as a result of physical bus probing/tampering. Very small impedance changes are detectable by exploiting the inherent metastability of flip-flops (FFs) to track the phase shift of the digital waveform caused by such changes, enabling the use of low-overhead and highly scalable digital circuitry. The invention preferably utilizes existing digital circuits that can potentially track waveform phase shifts and can preferably be implemented using field-programmable logic around the bus Tx to precisely measure and track the phase shift of output signals. The output digital waveforms launched by the Tx are preferably used as stimulus signals, enabling detection of probing attacks at runtime. That is, probe detection is preferably done concurrently with the normal data transfer on a bus without any interference, and the detection action preferably does not require stopping the normal data transfer, thus imposing zero latency to the communication channel.

Figure 1A:
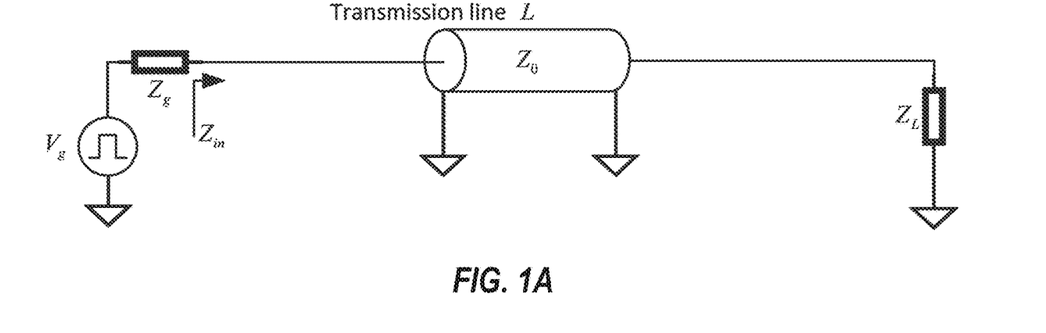
FIG. 1A shows a single-ended transmission line before a probing attack.
Figure 1B:
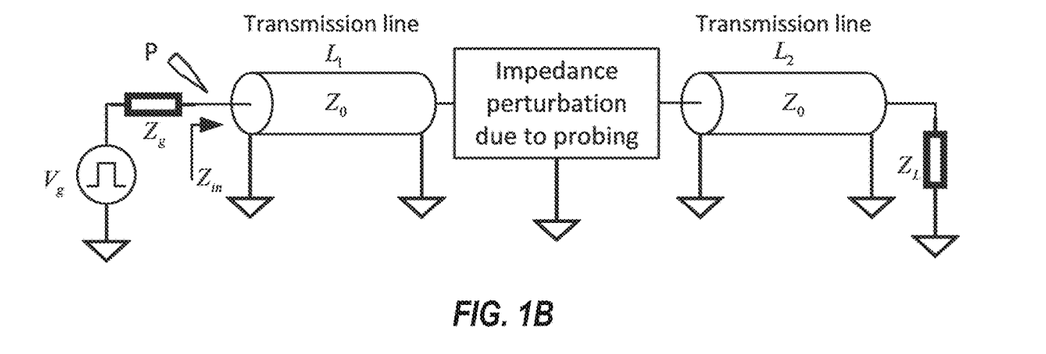
FIG. 1B shows the single-ended transmission line of FIG. 1A after a probing attack.
Figure 1C:
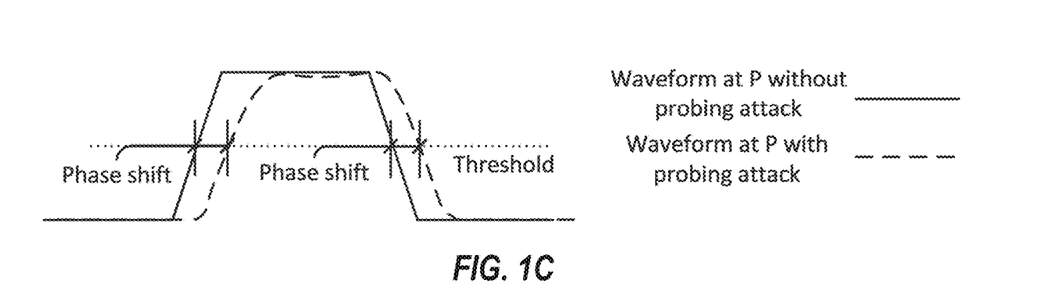
FIG. 1C shows waveforms traveling through the transmission line before and after the probing attack.

As shown in FIG. 1A, a single-ended communication channel, i.e. a bus (clock, address, control, data, chip select, etc.), can be modeled as a single circuit. $V_g$ is the input voltage, $Z_g$ is the output impedance, or generator impedance, and $Z_L$ is the load impedance at the receiver (Rx) end. A transmission line (Tx-line) with a length of L and a characteristic impedance of $Z_0$ is connecting the transmitter (Tx), also referred to as bus driver or generator, with the Rx. As shown in FIG. 1B, an attack probe introduces an impedance perturbation to this bus at a point along the bus, where $L=L_1+L_2$. For example, if an electric probe touches the trace it will typically introduce a shunt capacitance, while a non-contact magnetic probe will typically introduce a mutual inductance. A contact probe also introduces a serial resistance change, and an add-on bus interposer type of probe may introduce a more complex impedance perturbation. In addition, a temperature gradient can also cause an impedance variation. The input impedance ($Z_{in}$) is the equivalent impedance right outside the Tx, looking into the Tx-line. Probing/tampering attempts unavoidably induce a $Z_{in}$ change, leading to a phase shift of the output signals. Waveforms at the Tx output (point P) without and with probing attack are shown in FIG. 1C, where a phase shift is observed. The phase shift of the Tx output is a direct indicator of bus probing.

Figure 2A:
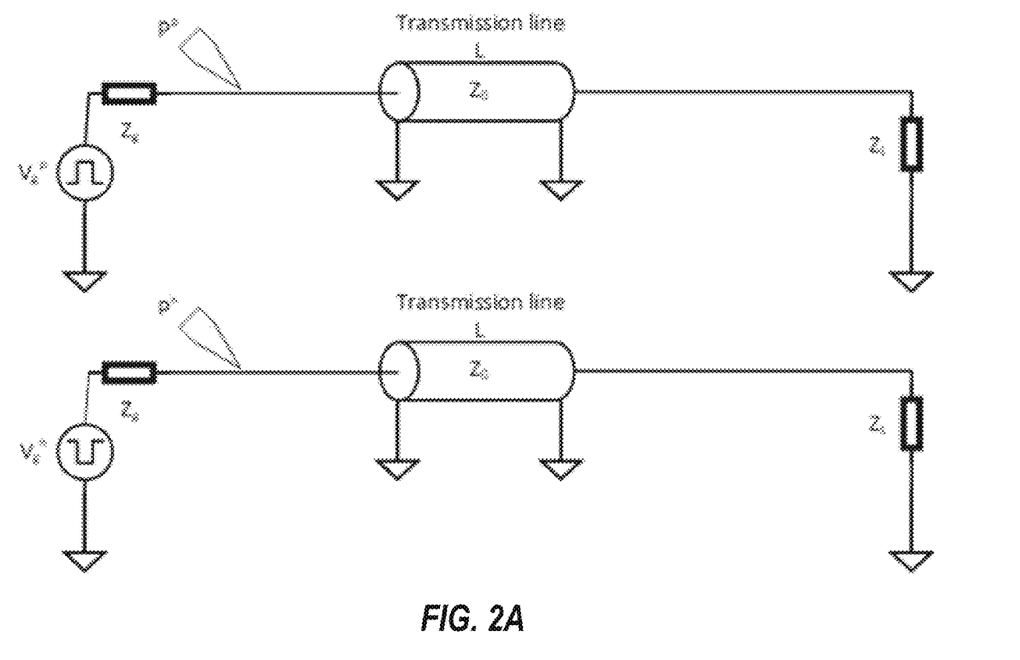
FIG. 2A is an illustration of a differential bus.
Figure 2B:
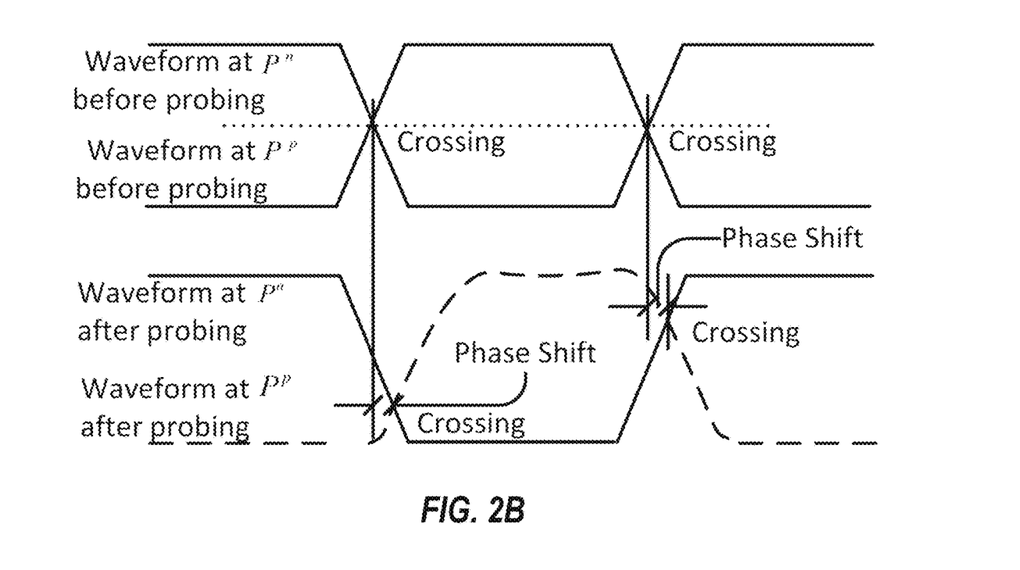
FIG. 2B shows a probing-attack-induced phase shift on the differential bus of FIG. 2A.

This concept also applies to a differential bus. FIG. 2A illustrates the situation on a differential pair. A differential bus can be modeled with a pair of identical Tx-lines with identical load and generator impedance. The Tx inputs, $V_g^p$ and $V_g^n$, are the positive and negative voltage waveforms, respectively, and are opposite in magnitude. To transfer a "1" into the differential bus, the positive Tx outputs a "1" waveform, while the negative Tx outputs a "0" waveform. $P^n$ and $P^p$ are physical points right outside the differential Tx on negative and positive sides, respectively. Assuming that a contact probe touches the positive trace, a phase shift is observed on the waveform at the positive output of the Tx ($P^p$), shown in FIG. 2B. The crossing points effectively experience a phase shift, which is a clear indicator of probing attack.

Figure 3A:
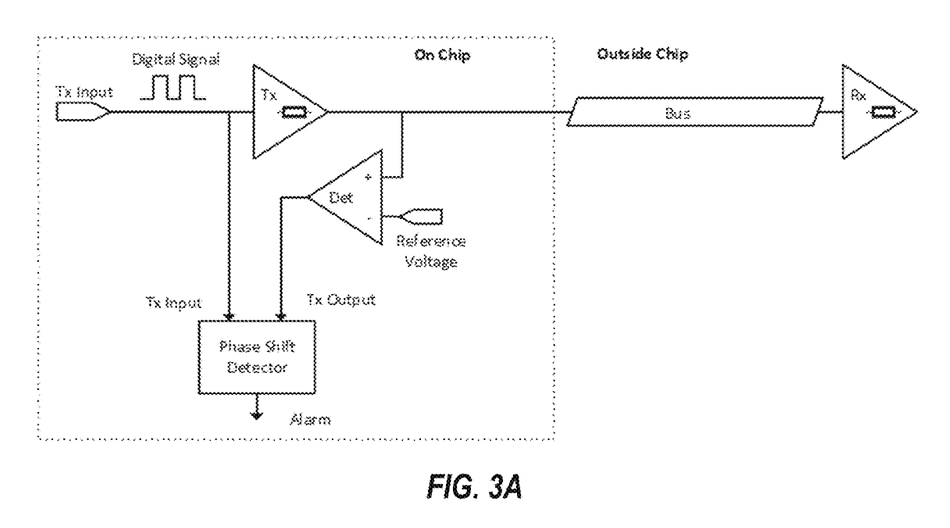
FIG. 3A is a block diagram of a probe detection circuit at the 10 port of a single-ended printed circuit board (PCB) bus.
Figure 3B:
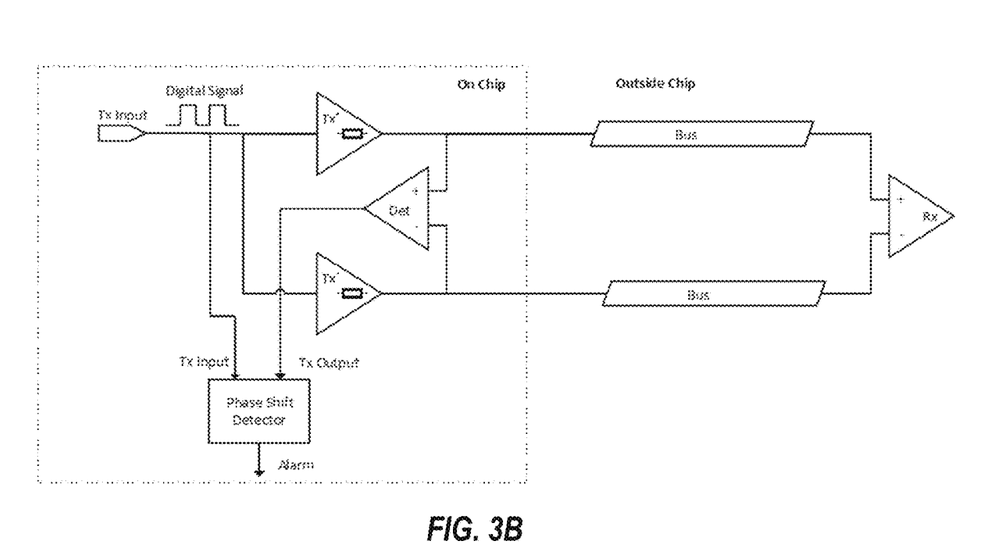
FIG. 3B is a block diagram of a probe detection circuit at the 10 port of a differential PCB bus.

FIG. 3A shows a block diagram of a probing detection circuit around a Tx-line of a single-ended bus on a printed circuit board (PCB). The original channel includes Tx, bus (a PCB trace), and Rx. The Tx is inside an IC chip, while the bus is on the PCB. The probe detection circuit is preferably built around the Tx and preferably comprises two modules: a detector (Det, essentially a comparator with a digital input), and a phase shift detector (detailed in the description of FIG. 5 below). When this system is in use, the Tx receives digital signals from an internal circuit. The Tx drives the bus and launches the signal into the bus. Next to the Tx, a comparator is preferably used to convert the Tx output waveform into its digital format, referred to as Tx output. The reference voltage is set in between the high and low voltage levels of the Tx output. This structure is readily available in a bi-directional 10 port. The phase shift detector preferably tracks the phase shift of the Tx output at the rising or/and falling edges of data in transmission. Once an abrupt phase shift is detected, it preferably sends out an alarm signal to the system. The detection circuit for a differential Tx is similar, as shown in FIG. 3B. The difference is that the Det captures the crossing point of positive and negative waveforms at the output ports of the positive and negative Txs. The Det output is referred to as the Tx output.

Figure 4:
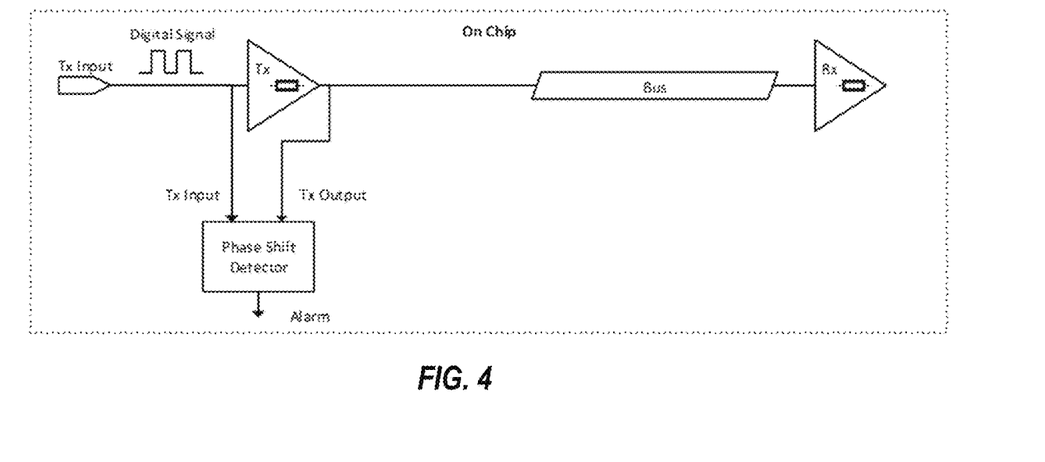
FIG. 4 is a block diagram of a probe detection circuit at the Tx of an on-chip bus.

A similar detection circuit can be built inside an IC chip, as shown in FIG. 4. It works in a similar fashion, except that the Tx output does not need a Det to convert to its internal digital format.

Figure 5:
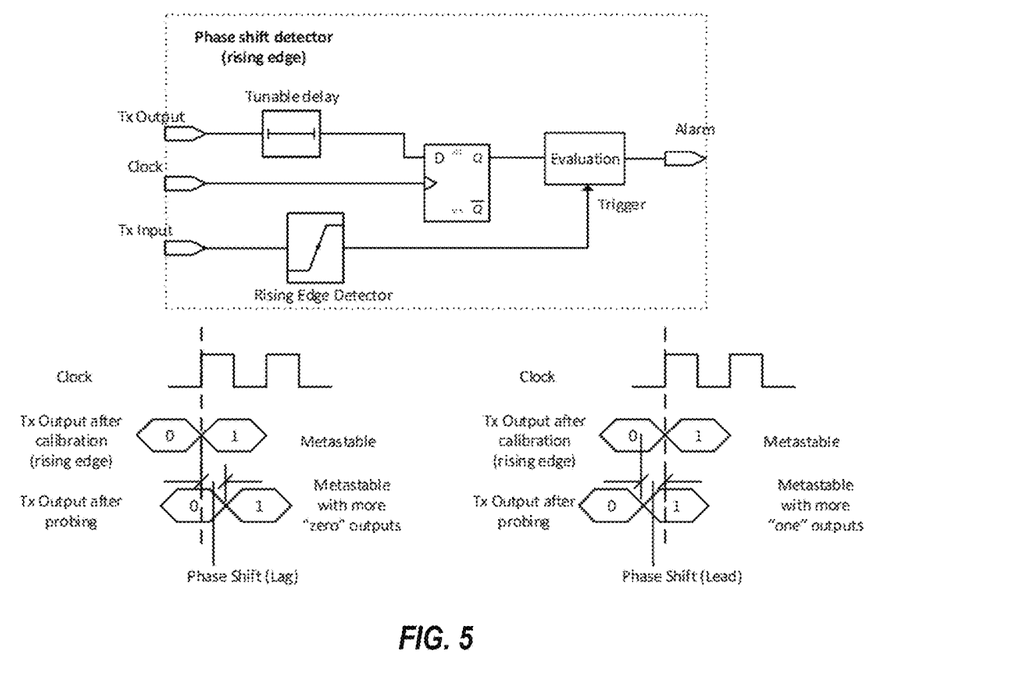
FIG. 5 is an embodiment of a metastability-based phase shift detector (rising edge) of the present invention.

Any arbiter circuit or high resolution delay measurement circuit can be used for phase shift detection as the phase shift detector in this invention. One embodiment is the simple and noise-insensitive metastability-based phase shift detector shown in FIG. 5, which detects probe-induced phase shift change of the data's rising edge. The Tx output preferably goes through a tunable delay line and is captured by a flip flop (FF) which is preferably synchronized with the system clock. A rising edge detector is preferably used to identify incoming rising edges (transition from "0" to "1"). At the system initialization stage, the tunable delay line is preferably adjusted to align the rising edge transition with the rising edge of the clock. This way, the FF is working in a metastable state, in which it could output either "0" or "1". In addition, the random noise on the circuit, stemming from thermal noise and jitter, may randomly bias the output of the FF (denoted as Q) to output "0" or "1". The output of FF is statistically stable, i.e., the probability of outputting "1", $P\{Q=1\}$, is a constant. This probability ρ, the rate of logic "1" over a fixed number of tests, can be measured using an evaluation module, which preferably comprises a counter and counts the number of captured "1"s (denoted as M) over a certain number of rising edges (denoted as N). Thus, ρ=M/N. During system initialization, the delay line is preferably automatically tuned so that ρ is close to 50%. This delay (denoted as $T_d$) is preferably saved in the system. During runtime operation, upon a probing attack, the phase shift moves the Tx output. For example, shown in the bottom left of FIG. 5, the Tx output is shifted to the right ("lag" case). As a result, the ρ deviates from its initial value (close to 50%) and decreases, as measured by the evaluation module. In this case, the phase shift detector preferably launches an alarm signal. The bottom right of FIG. 5 shows the "lead" case, in which the phase of Tx output is shifted to the left, and the $P\{Y=1\}$ decreases. Similarly, the phase shift detector can function upon falling edges.

Figure 6:
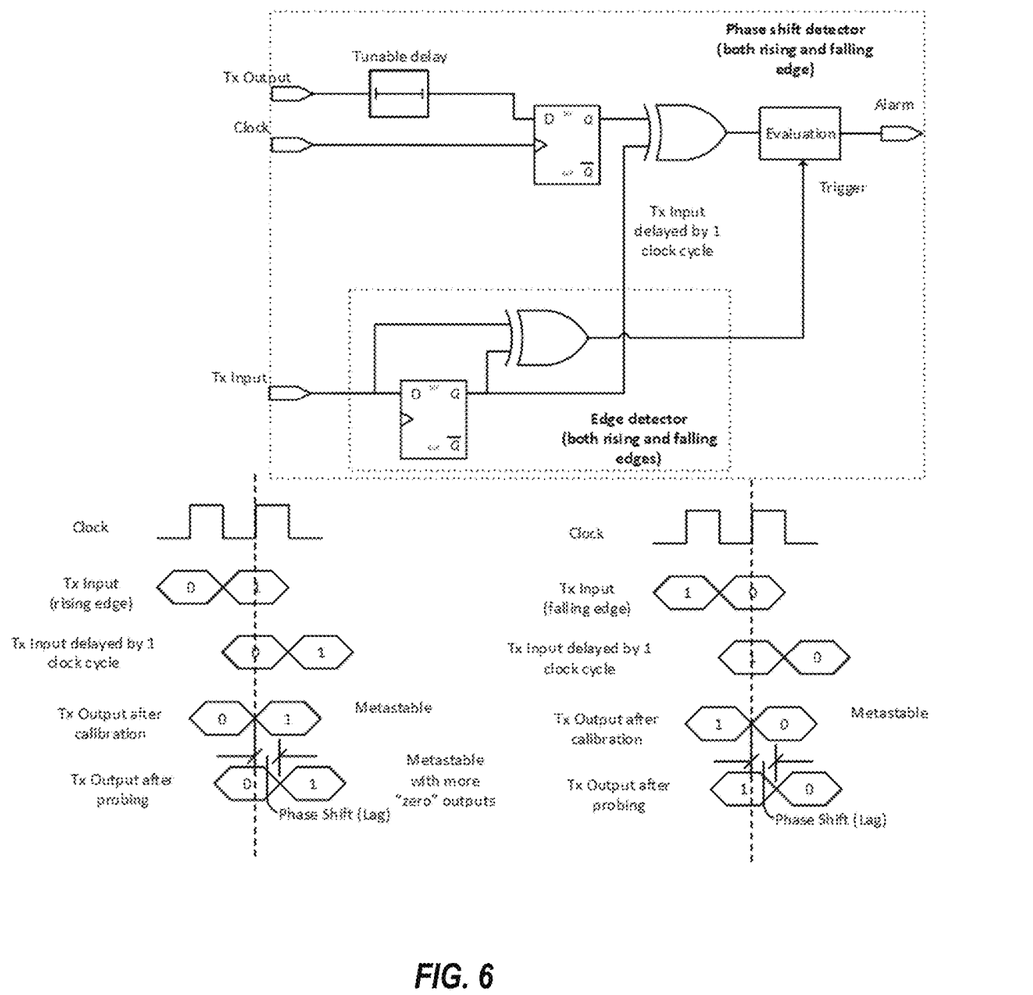
FIG. 6 is an embodiment of a metastability-based phase shift detector (both rising and falling edge) of the present invention.

The metastability-based phase shift detector can also work for both rising and falling edges as shown in FIG. 6. The edge detector triggers the evaluation module upon both rising and falling edges. The output of the FF is preferably XORed with "Tx input delayed by 1 clock cycle" to generate the input of the evaluation module. Upon the arrival of a rising edge, assuming that the Tx output shifts to the right (lag) as a result of a probing attack, the output of the XOR gate will output more "1"s, as illustrated by the timing diagram in the bottom left of FIG. 6. Upon the arrival of a falling edge, shown in the bottom right of FIG. 6, the same lag also results in more "1"s at the output of the XOR gate. In the case of a leading shift, the XOR gate outputs more "0"s at both the rising and falling edges. Thus, the probability of the XOR output can be used as a probing indicator.

Tampering/Modification Detection and System Identification Via Time Delay ($T_d$)

The stored $T_d$ can be used to detect tamper/modification happening during a power-off or idle state. After power-on, the protection system can implement a prestored $T_d$ in the tunable delay element, and evaluate the $P\{Y=1\}$ before starting communication. A change of $P\{Y=1\}$ beyond measurement tolerance is a clear indication of bus tamper/modification. The system preferably sends out an alarm signal.

When multiple traces (a total number of J) are under protection, the $[T_d^1, T_d^2, \ldots T_d^j \ldots T_d^J]$ array can be used to identify a subsystem. For example, a dual in-line memory module (DIMM) with multiple traces (DQ, DQS, address, etc.) can be identified using this time delay vector.

Countermeasure Power Side Channel Attack

Power-based side channel attacks, such as a power-analysis attack or power-glitch attack, typically require the attacker to probe the power of the system. Often the attacker needs to desolder the decoupling capacitors to improve the effectiveness of power-based side channel attacks. Power probing changes the power fluctuation and noise distribution/level of the chip. In addition, the metastable condition of the flipflop (in both FIGS. 5 and 6) is changed due to power probing. The change of the statistical output is an indication of power probing. Thus, the present invention can detect power probing and countermeasure power-based side channel attacks.

EXAMPLES

Figure 7:
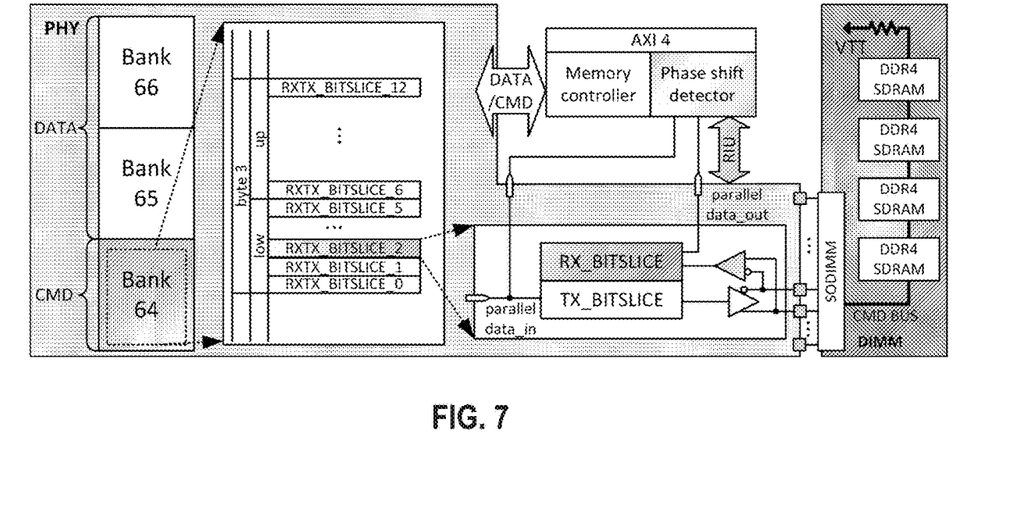
FIG. 7 shows implementation of the present invention on a DDR4 memory controller.

An embodiment of the present invention was implemented in a DDR4 memory controller on a Xilinx FPGA development board (ZCU104). A DIMM (Micron MTA4ATF51264HZ-2G6E1) with four DDR4 chips and a total storage capacity of 2 GB was mounted on the memory slot of the ZCU104. A Xilinx Memory Interface Generator (MIG) was employed to generate the DDR4 memory controller including the logic for physical interface (PHY). The DDR was configured to operate with a data rate of 2400 MT/s and a clock speed of 1200 MHz. Verification that the system could write/read data into/from the DIMM seamlessly was first performed. Then the present invention was implemented in the DDR memory controller by modifying the PHY, as shown in FIG. 7, in which the modifications are shown as striped. The detection circuit was built in one lane of the memory bus. The clock lane (differential pair), which belongs to the command/address (CMD/ADDR) bus cluster (fly-by topology on DIMM), was protected. The clock I/O was modified from unidirectional to bidirectional in order to monitor the output waveform. The PHY Register interface unit (RIU) was connected to the Processing Unit (PS), enabling tuning of the input delay of any bitslice, as described in FIG. 5, using software. The phase shift detector was built on programmable logic (PL) fabric. It triggered on the rising edge of signal (clock lane), recorded $\rho=M/N$ ($N=10^4$ in this design), and sent it to the PS. The PS was also employed to control the detection circuit and write/read data into/from the DDR. A memory test program was running during the experiments to make sure the memory controller was under normal operation, enabling verification and demonstration of runtime probing/tampering detection.

Add-on Interposer Detection Experiment

Figure 8A:
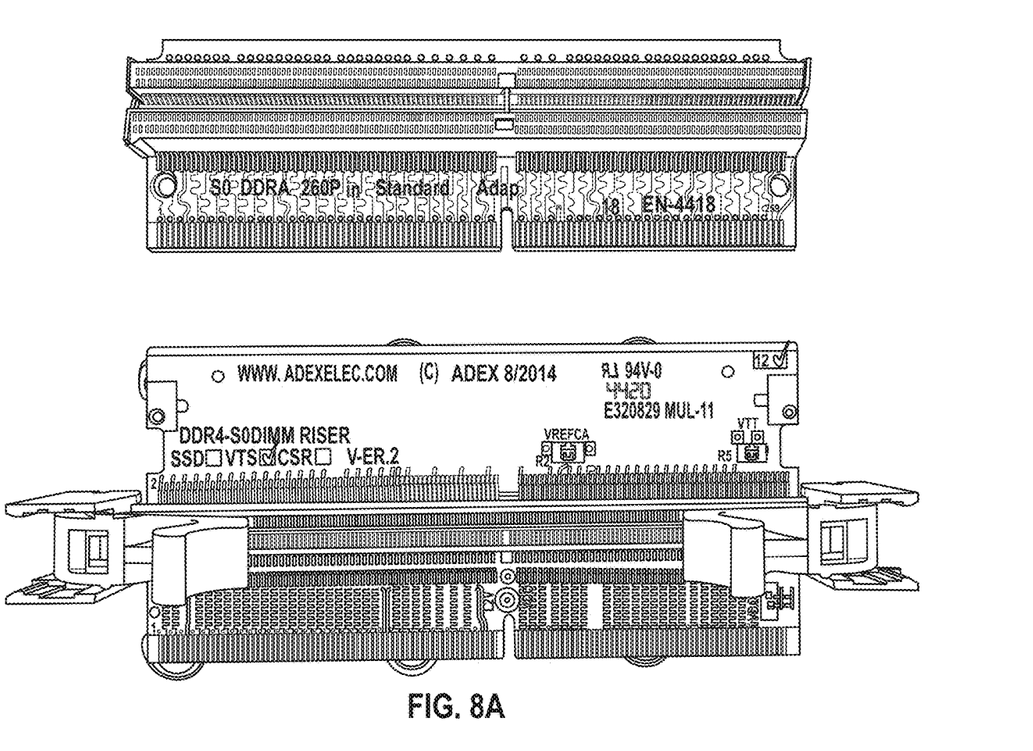
FIG. 8A is a photograph of two different types of DDR interposers.
Figure 8B:
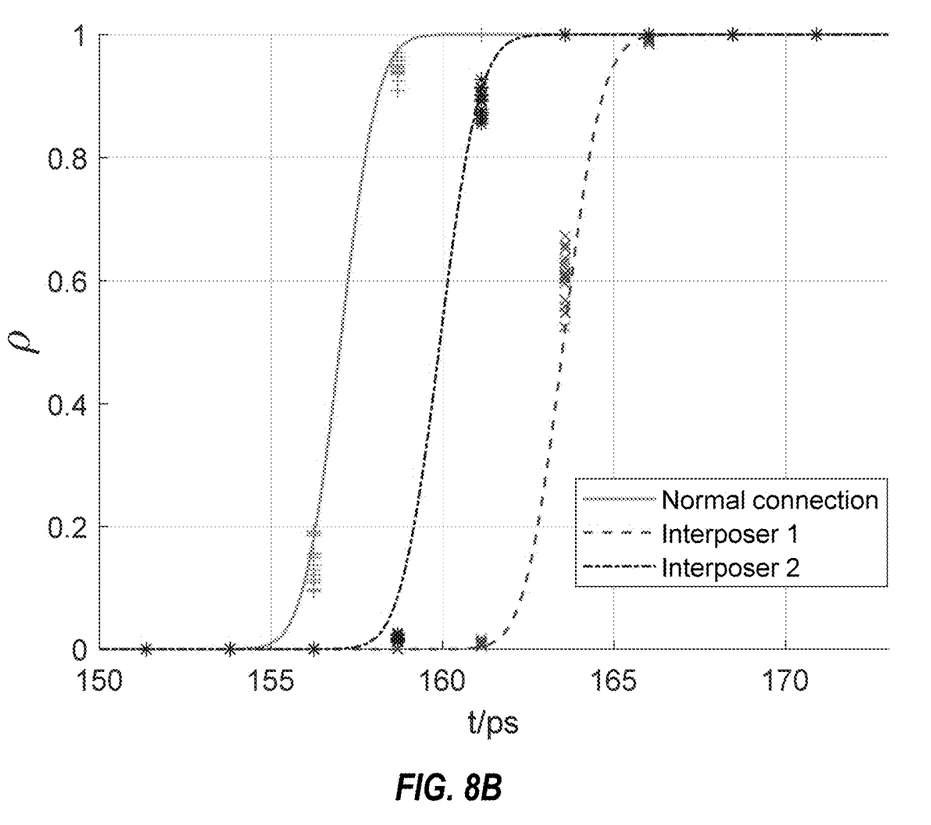
FIG. 8B shows the rate of logic "1", $\rho$, over different input delays in the example.

It has been reported that an add-on DIMM interposer together with a logic analyzer or an FPGA can be employed to breach secured systems, such as Intel SGX MEE. One experiment was designed to show that the present invention is effective in protecting a bus against such attacks. Two different types of DDR interposers are shown in FIG. 8A. As shown in FIG. 8B, the capturing rate of "1", $\rho$, is plotted against different input time delay points, where the delay adjustment resolution is 2.44 ps. It clearly shows the FF's metastability transition. For example, under normal connection, the transition is between 156 ps and 159 ps. Two different interposers were added between the board and DIMM to test the detection circuit. The phase shift of the Tx output signal shown for each interposer is a direct indicator of the presence of such add-on interposers.

Probing Detection Experiment

Figure 9A:
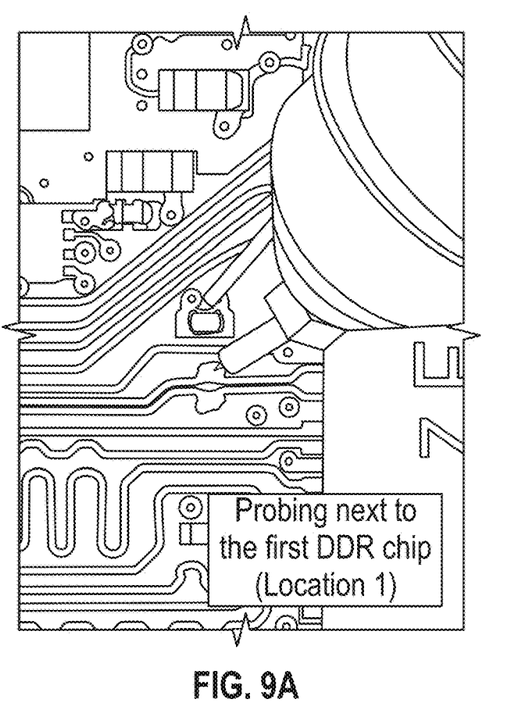
FIG. 9A is a photograph showing probing next to the first DDR chip (Location 1).
Figure 9B:
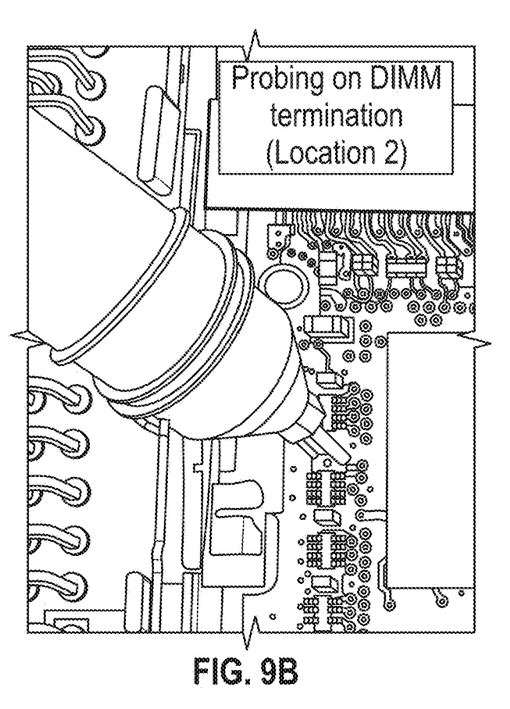
FIG. 9B is a photograph showing probing on the DIMM termination (Location 2).
Figure 9C:
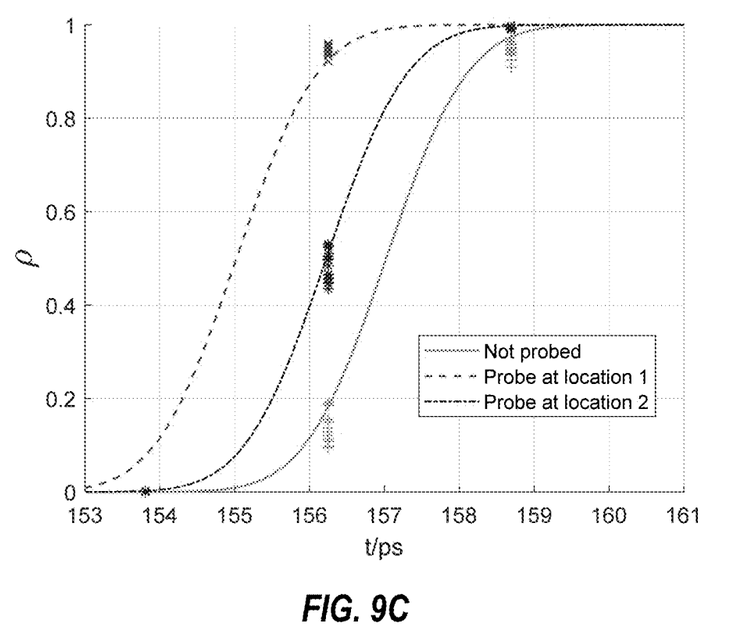
FIG. 9C shows the rate of logic "1", $\rho$, over different input delays.
Figure 9D:
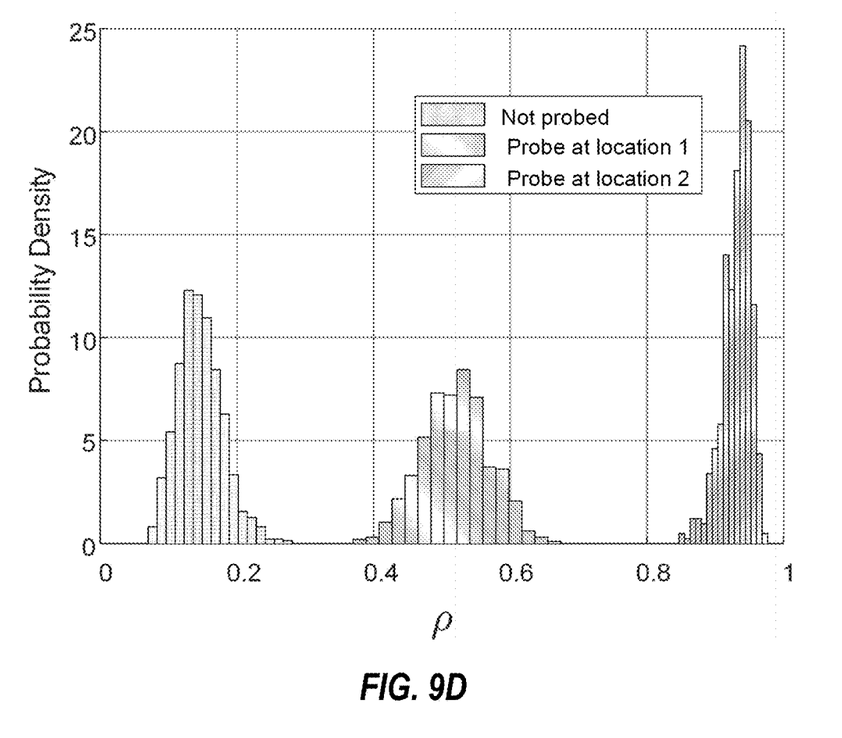
FIG. 9D is a histogram showing the probability density vs. p taken by fixing the input time delay at 156.2 ps.

An active probe (100 kΩ; 0.6 pF) was applied on the clock lane to emulate a probing attack. FIG. 9A shows probing location 1, next to the first DDR chip, and FIG. 9B shows probing location 2, at the termination of the clock lane in the CMD/ADDR cluster. FIG. 9C plots $\rho$ against input time delay points, clearly showing that both probing attempts resulted in significant phase shift or $Z_{in}$ change. By fixing the input time delay at 156.2 ps, one can plot the histogram of $\rho$ as shown in FIG. 9D, indicating that the change of $\rho$ is a direct indicator of probing attacks.

Cold Boot Detection Experiment

Figure 10A:
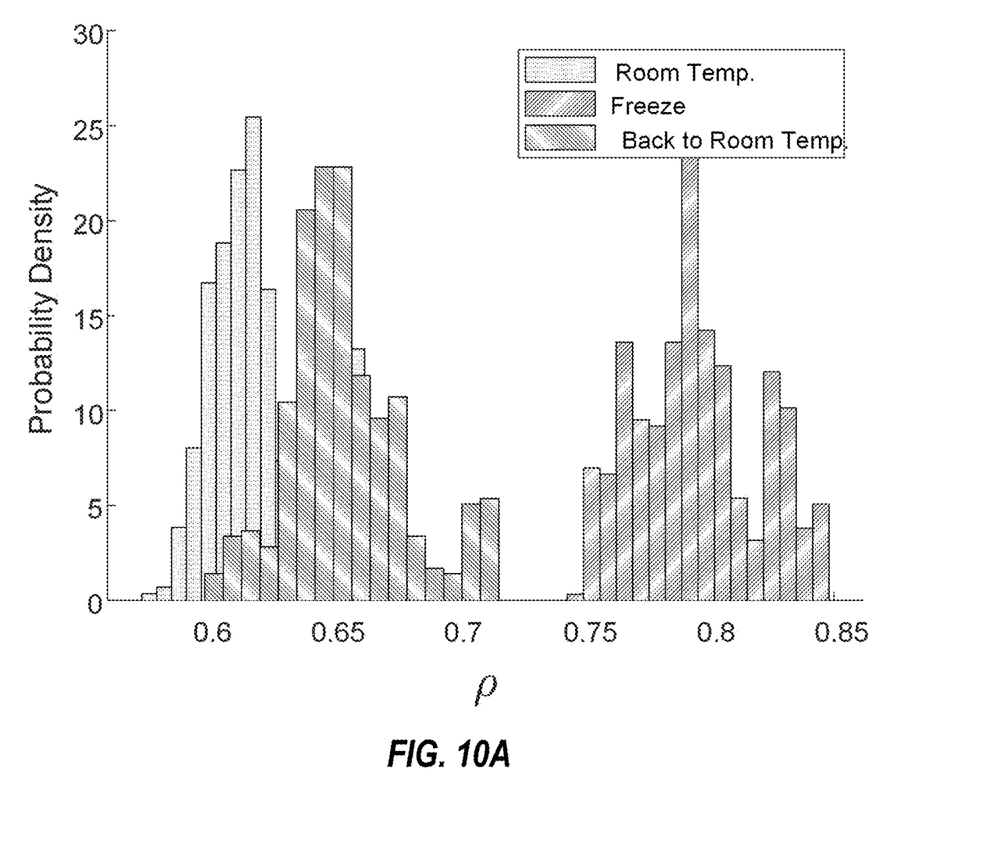
FIG. 10A shows histograms of $\rho$ under room temperature, during a cold boot attack, and back to room temperature.
Figure 10B:
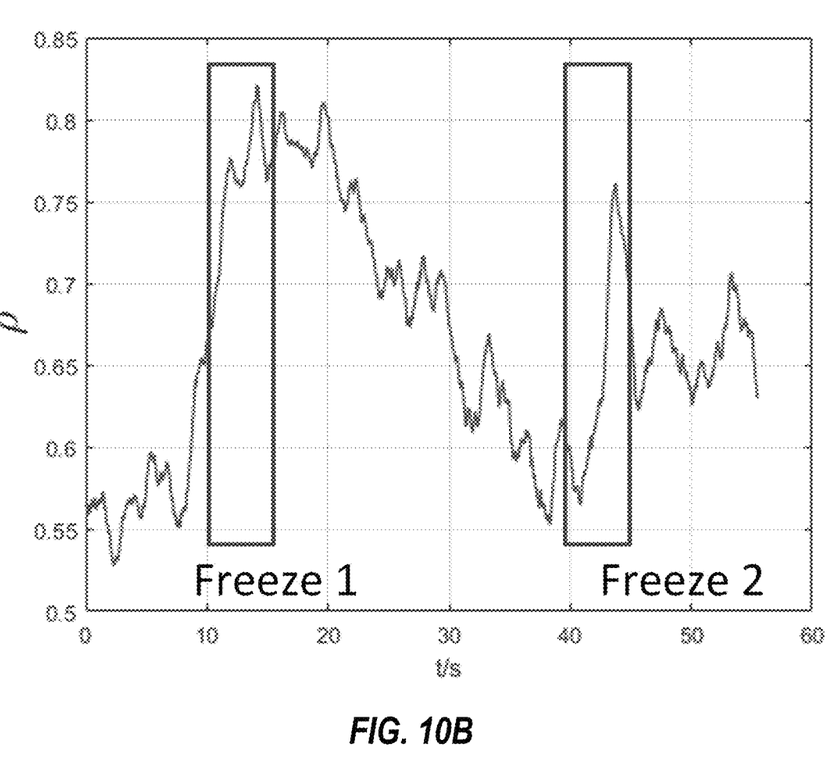
FIG. 10B shows p over time for the cold boot attack.

A cold boot attack on DRAM typically requires an attacker to significantly lower the DRAM chip temperature. This temperature drop results in an impedance change on both the bus and the load (receiver on DRARM chip) which can be detected by the disclosed anti-probing technology. A cold boot attack relies on the data remanence property of DRAM to retrieve memory contents that remain readable in the minutes after power has been removed at low temperatures. A freeze spray was used to quickly bring down the temperature of the DIMM to emulate cold boot attack. The sudden drop of the ambient temperature also induced an abrupt $Z_{in}$ change, leading to a detectable phase shift. FIG. 10A plots the distribution of $\rho$ (at a fixed input time delay point) under normal operation, cold boot attack, and back to normal. FIG. 10B plots $\rho$ over time during the cold boot attack, clearly showing that the cold boot attack can be detected at runtime.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method for detecting tampering with a bus, the method comprising:
   providing a computer chip comprising a bus transmitter and a phase shift detection circuit;
   the phase shift detection circuit comparing a phase of an input waveform to the bus transmitter with a phase of an output waveform Produced by the bus transmitter, the input waveform comprising an existing data transfer signal; and
   detecting a phase shift between the input waveform and the output waveform;
   wherein the phase shift is induced by an impedance change of the bus, the impedance change caused by tampering with the bus; and
   wherein the comparing and detecting steps are performed without stopping the transfer of the existing data transfer signal.

2. The method of claim 1 performed during runtime.

3. The method of claim 2 performed concurrently with normal data transfer on the bus.

4. The method of claim 3 imposing zero latency to communications on the bus.

5. The method of claim 1 comprising converting the output waveform to a digital format.

6. The method of claim 1 wherein the detecting step is performed by a circuit comprising a flip flop.

7. The method of claim 6 wherein the phase shift is detected at rising and/or falling edges of data being transmitted by the transmitter.

8. The method of claim 6 comprising delaying the output waveform, thereby placing the flip flop into a metastable state prior to use of the bus.

9. The method of claim 8 comprising detecting a change in an output probability of the flip flop.

10. The method of claim 8 comprising detecting a difference in a time delay at which an output of the flip flop transitions between 0 and 1.

* * * * *